(12) United States Patent
Muramatsu (10) Patent No.: US 6,879,826 B2
(45) Date of Patent: Apr. 12, 2005

(54) COMMUNICATION DEVICE AND COMMUNICATION METHOD

(75) Inventor: Toshihiko Muramatsu, Shizuoka (JP)

(73) Assignee: NEC Corporation, Tokyo (JP)

( * ) Notice: Subject to any disclaimer, the term of this patent is extended or adjusted under 35 U.S.C. 154(b) by 651 days.

(21) Appl. No.: 09/777,477

(22) Filed: Feb. 6, 2001

(65) Prior Publication Data

US 2001/0012774 A1 Aug. 9, 2001

(30) Foreign Application Priority Data

Feb. 9, 2000 (JP) ........................................ 2000-031510

(51) Int. Cl.$^7$ ................................................. H04Q 7/20
(52) U.S. Cl. .................... 455/423; 455/67.11; 455/557; 455/525
(58) Field of Search ........................... 455/412.1, 67.11, 455/412.2, 418, 419, 420, 573, 343.2, 556.1, 557, 525, 423, 673

(56) References Cited

U.S. PATENT DOCUMENTS

| | | | |
|---|---|---|---|
| 4,761,824 A | | 8/1988 | Saito |
| 4,903,319 A | | 2/1990 | Kasai et al. |
| 5,239,694 A | * | 8/1993 | Toyoshima ............... 455/115.4 |
| 5,408,520 A | * | 4/1995 | Clark et al. ............... 379/93.07 |
| 5,608,324 A | * | 3/1997 | Yoshida ....................... 324/426 |
| 5,764,899 A | * | 6/1998 | Eggleston et al. .......... 709/203 |
| 5,826,198 A | * | 10/1998 | Bergins et al. ............. 455/557 |
| 5,835,366 A | * | 11/1998 | Pleso et al. .................... 363/59 |
| 6,041,217 A | * | 3/2000 | Martin et al. .............. 340/7.43 |
| 6,166,729 A | * | 12/2000 | Acosta et al. ................ 345/719 |
| 6,219,540 B1 | * | 4/2001 | Besharat et al. ............. 455/421 |

FOREIGN PATENT DOCUMENTS

| | | |
|---|---|---|
| EP | 0 594 336 A1 | 4/1994 |
| GB | 2 326 062 A | 12/1998 |
| GB | 2 333 934 A | 8/1999 |
| JP | 62-286324 | 12/1987 |
| JP | 3-284031 | 12/1991 |
| JP | 10-145862 | 5/1998 |
| JP | 2000-183801 | 6/2000 |

OTHER PUBLICATIONS

Japanese Office Action issued on Oct. 30, 2002 (w/ English translation of relevant portions).

* cited by examiner

Primary Examiner—Lester G. Kincaid
Assistant Examiner—Phuoc H Doan
(74) Attorney, Agent, or Firm—Dickstein, Shapiro, Morin & Oshinsky, LLP.

(57) ABSTRACT

The communication device includes a communication microcomputer 203 and an information-processing microcomputer 207. The communication microcomputer 203 has a line quality measuring section 301, a battery level measuring section 302, a data table 304, and a data transmission/reception decision section 303. The information-processing microcomputer 207 has a data transmission/reception prediction section 307 and a communication processing section 305. The electric field level, degradation in line quality, and the remaining amount of a battery are periodically monitored during data communication such as electronic mail reception. The data transmission/reception decision section 303 implements a decision process based on various predetermined information sets acquired through the monitoring. When deciding that the line is disconnected during communication, the data transmission/reception decision section 303 interrupts the mail reception and performs a logging-out with the server, thus disconnecting the line. As a result, it can be avoided that the connection between the terminal and the server is maintained.

20 Claims, 6 Drawing Sheets

| BATTERY LEVEL | DATA TRANSMITTABLE/RECEIVABLE AMOUNT |
|---|---|
| DURING CHARGING | LIMITLESS |
| 5.00 | 100K BYTE |
| 4.80 | 100K BYTE |
| 4.60 | 80K BYTE |
| 4.40 | 80K BYTE |
| 4.20 | 40K BYTE |
| 4.00 | 35K BYTE |
| 3.80 | 10K BYTE |
| 3.60 | 10K BYTE |
| 3.40 | 8K BYTE |
| 3.20 | 5K BYTE |
| 3.00 | 4K BYTE |
| 2.80 | 3K BYTE |
| 2.60 | 2K BYTE |

COMMUNICATION DEVICE AND COMMUNICATION METHOD

BACKGROUND OF THE INVENTION

The present invention relates to a communication device and a communication method, each suitable in use for mobile communication equipment, typically, portable terminals (PDAs).

Conventionally, there is the technique of connecting a portable phone to a notebook personal computer (PC) or portable terminal (PDA), which uses a battery and can be readily carried, to exchange electronic mails or to have access to the Internet. Portable terminals, each incorporating a radio module, are available in the market. Such a portable terminal has made it possible to easily access servers through the Internet during movement.

For example, JP-A No. 145862/1998 discloses the radio data communication card that restricts the calling operation of a portable phone when the receive level of radio waves from a base station is less than a prescribed value. Moreover, JP-A No. 286324/1987 discloses the portable phone that reduces its transmission power when the output voltage value of the power source thereof drops, so that the serviceable life of the portable phone can be prolonged.

However, the above-mentioned previous techniques have the following disadvantages. Regarding the first problem, the constraint is performed when the reception level of radio waves of less than a prescribed value is checked at the time of starting communications. However, it is not stipulated that the transmission/reception level is checked after the starting of communications. For that reason, when the line is disconnected due to a decrease in reception level on a train or in a car, the connection between the terminal and a server on the network may be held in the current state. Thereafter, when an access to the server on the network is established after stabilization of the radio wave level, a double logging-on state occurs. As a result, the terminal may not be connected to the server for a fixed period.

Moreover, regarding to the second problem, the disclosed invention in which the transmission output is reduced when the output voltage value of the power source of mobile communication equipment drops provides the demerit to data communications. This approach increases error data, partial data missing, and an increased frequency of re-transmission on the network so that data cannot be stably transmitted and received on the network.

SUMMARY OF THE INVENTION

The present invention is made to overcome the above-mentioned problems.

An objective of the present invention is to provide a communication device and a communication method, each which can decrease the burden on a network and can acquire predetermined information quickly and smoothly.

The present invention provide a communication device, wherein data is transmitted and received via a communication section and a line, comprising: decision means for deciding whether or not to transmit and receive data based on predetermined information corresponding to the state of the line or the internal state of the device or whether or not to interrupt communications if the device is currently in a transmission/reception state; and a controller for controlling said communication section according decision results from said decision means.

In another aspect of the invention, the invention further comprising: an information holder for holding said predetermined information; said decision means deciding whether or not to transmit and receive data based on current predetermined information and old predetermined information held in said holder, or whether or not to interrupt communications if the device is currently in a transmission/reception state.

In another aspect of the invention, the invention further comprising notification means for notifying a user of decision results according to the decision results of said decision means.

The controller controls said communication means to disconnect the line after the logging-out in accordance with a predetermined communication procedure, when said decision means decides disconnection of communications.

The predetermined information contains information representing a reception level.

The predetermined information contains information representing an error rate.

The predetermined information contains information representing a response timing from a connected destination.

The predetermined information contains information representing an output voltage level of a power source within the device.

The power source within the device comprises a secondary battery.

In another aspect of the invention, the invention further comprising prediction means for predicting a transmittable/receivable data amount based on a charging amount or output voltage level of said secondary battery; said predetermined information containing prediction results acquired by said prediction means.

In another aspect of the invention, the invention further comprising second prediction means for predicting a data amount to be transmitted or received in current communications; said predetermined information containing prediction results acquired by said second prediction means.

The present invention provide a communication method suitable for a communication device which transmits and receives data via a communication section and a line, said method comprising the steps of: deciding whether or not to transmit and receive data based on predetermined information corresponding to the state of the line or the internal state of the system or whether or not to interrupt communications if the device is currently in a transmission/reception state; and controlling said communication section to disconnect the line after the logging-out in a predetermined communication procedure, in accordance with decision results in said decision step.

In another aspect of the invention, the invention further comprising the steps of: holding said predetermined information; deciding whether or not to transmit and receive data based on current predetermined information and old predetermined information held in said holder, or whether or not to interrupt communications if the device is currently in a transmission/reception state.

In another aspect of the invention, the invention further comprising the step of notifying a user of decision results according to the decision results of said step of deciding.

The step of controlling further comprising the step of controlling said communication means to disconnect the line after the logging-out in accordance with a predetermined communication procedure when the decision result of said step of deciding is disconnection of communications.

The predetermined information contains information representing a reception level.

The predetermined information contains information representing an error rate.

The predetermined information contains information representing a response timing from a connected destination.

The predetermined information contains information representing an output voltage level of a power source within the device.

The power source within the device comprises a secondary battery.

In another aspect of the invention, the invention further comprising the step of predicting a transmittable/receivable data amount based on a charging amount or output voltage level of said secondary battery; said predetermined information containing prediction results acquired by said step of predicting. In another aspect of the invention, the invention further comprising the step of secondary predicting a data amount to be transmitted or received in current communications; said predetermined information containing prediction results acquired by said step of secondary predicting.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
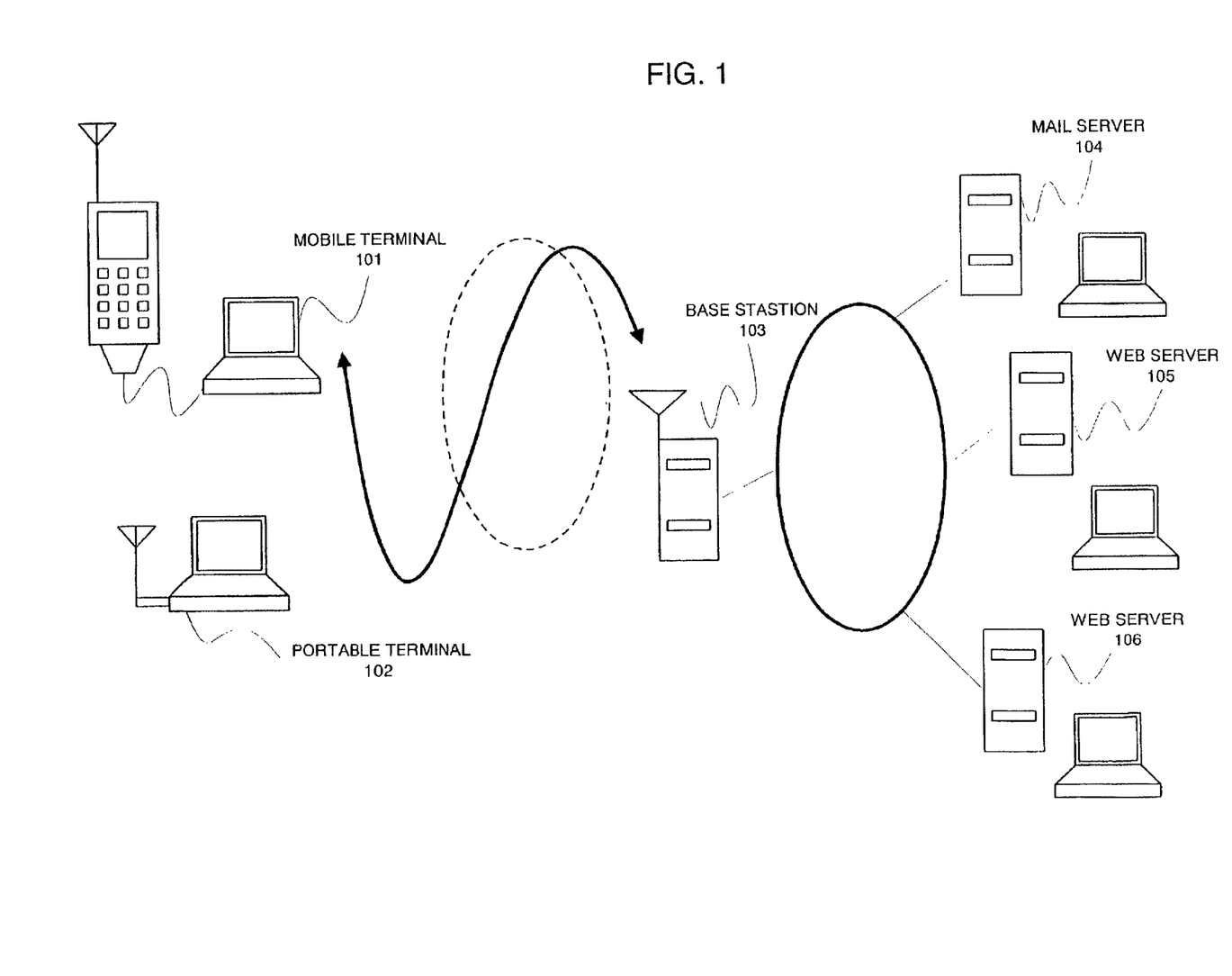
FIG. 1 is an explanatory diagram illustrating a data communication system according to the present invention.

First, the data communication system including the communication device of the present invention will be described below before an explanation of an embodiment of the present invention. FIG. 1 shows as an example the configuration of the data communication system. Referring to FIG. 1, numeral 101 represents a mobile terminal in which a personal computer is connected to a portable phone. Numeral 102 represents a portable terminal incorporating a portable phone. Numeral 103 represents a base station. The base station 103 is connected to an electronic mail server 104 and WEB servers 105 and 106 via the network. The mobile terminal 101 and the portable terminal 102 exchange data with the base station 103 via the network. An embodiment of the present invention will be described in detail by referring to the attached drawings.

(First Embodiment)

Figure 2:
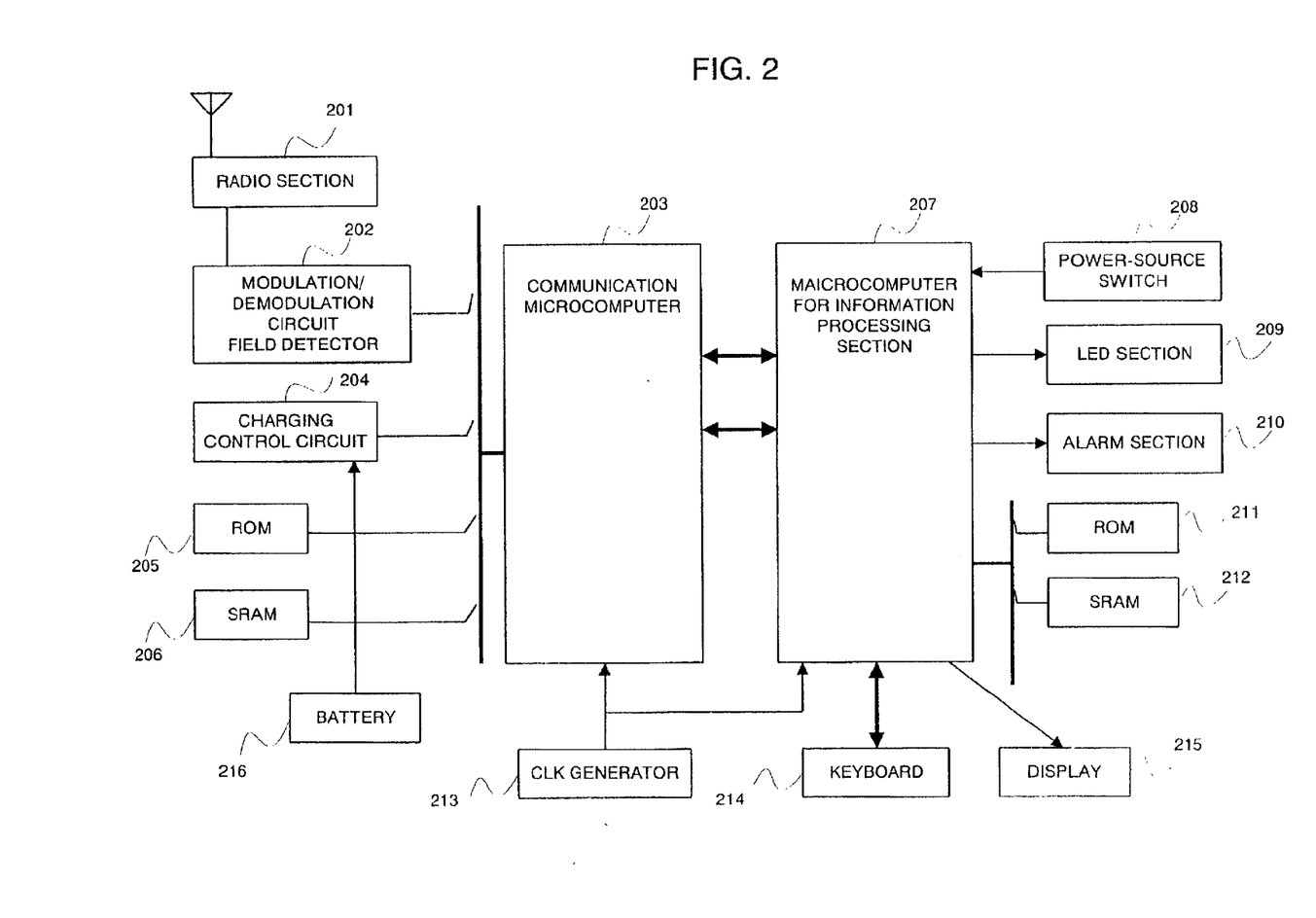
FIG. 2 is a block diagram illustrating the whole configuration of the first embodiment according to the present invention.

FIG. 2 shows the whole configuration of the first embodiment applied to a portable phone built-in portable terminal of the present invention. In the portable terminal related to the present embodiment shown in FIG. 2, a communication microcomputer 203 and an information-processing microcomputer 207 form a core section. The combination of a radio section 201 that transmits and receives radio waves and a modulation/demodulation circuit 202 work as a peripheral circuit of the communication microcomputer 203. The modulation/demodulation circuit 202 includes an electric field detector. The electric field detector detects the received levels of signals from the base station 103 received by the antenna and then creates information representing the received level.

The communication microcomputer 203 operates according to the program information set in the ROM (Read-Only Memory) 205 and mainly executes a data transmission/reception process related to a radio layer. Moreover, the communication microcomputer 203 monitors the output voltage level and the charging amount of the battery 216 via the charging control circuit 204 and monitors the received level of a signal received by the electric field detector. The SRAM (Static Random Access Memory) 206 is used as a work memory.

The peripheral circuit of the information-processing microcomputer 207 includes the power-source switch 208, the keyboard 214, the display 215, the LED section 209, and the alarm section 210. The information-processing microcomputer 207 operates according to the program information set in the ROM 211 and mainly deals with user I/F (application I/F) and data transmission/reception on layers higher than the radio layer. It has currently become most widespread to execute the data transmission/reception process with the TCP/IP protocol. The data communication interface between the communication microcomputer 203 and the information processing microcomputer 207 is carried out through exchanging the modem command and the PPP data frame. The SRAM 212 is used as a work memory.

A rechargeable secondary battery such as lithium-ion battery, nickel-cadmium battery, or nickel metal hydride battery may be used as the battery 216 supplying the power source voltage to various sections of the portable terminal. The charging control circuit 204 charges, if necessary, the battery 216. The CLK (clock) generator 213 generates clock signals to the communication microcomputer 203 and the information-processing microcomputer 207. Each of the communication microcomputer 203 and the information-processing microcomputer 207 operates with predetermined timing according to clock signals.

Figure 3:
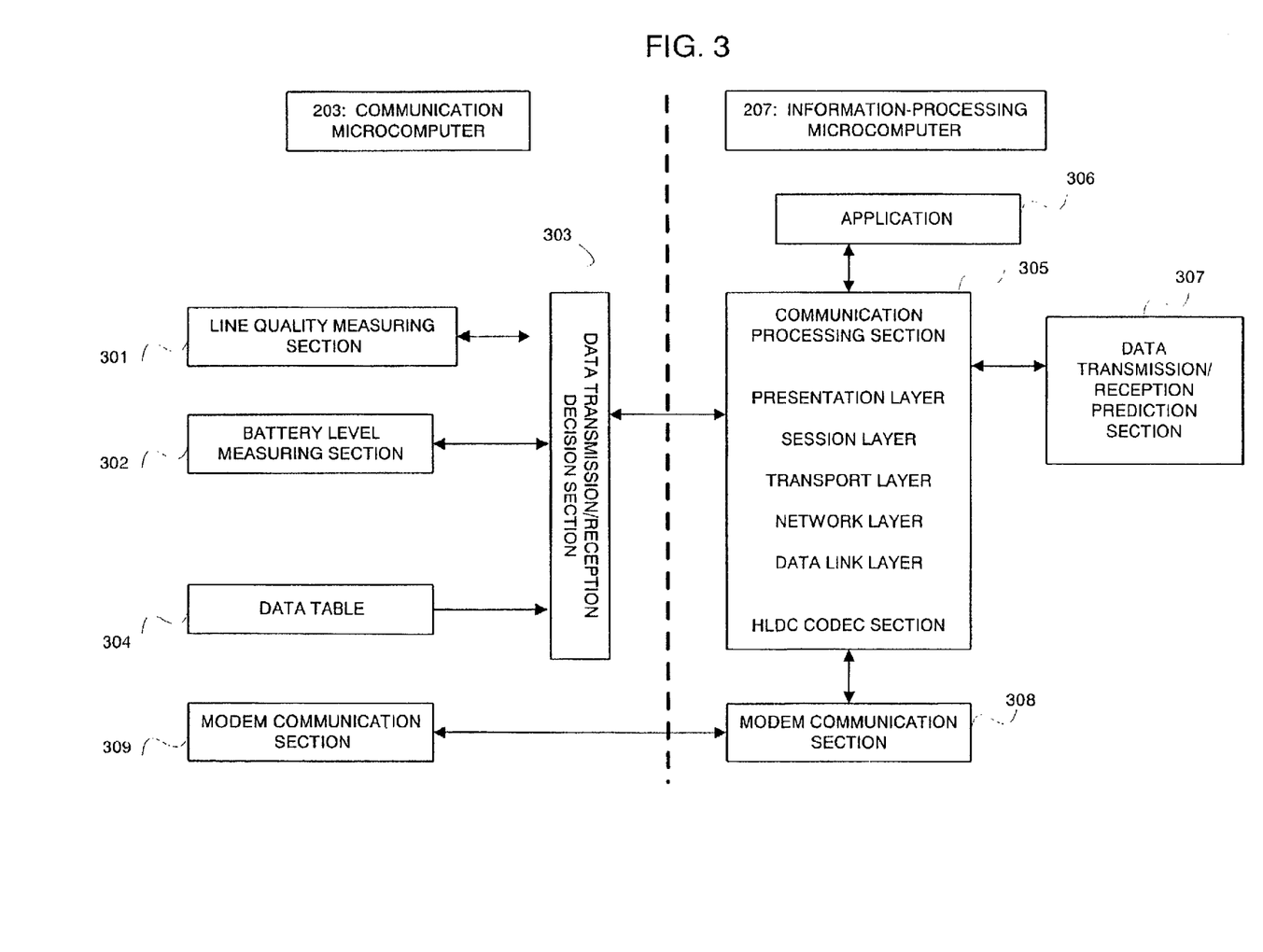
FIG. 3 is a block diagram illustrating the main section of the first embodiment according to the present invention.

FIG. 3 shows the function of the communication microcomputer 203 and the function of the information-processing microcomputer 207. The software process of each microcomputer realizes various functions shown in FIG. 3. However, a discrete circuit may realize the various functions without using the microcomputer.

The communication microcomputer 203 shown in FIG. 3 includes a line quality measuring section 301 for managing line conditions, a battery level measuring section 302 for monitoring the output voltage level and the charging amount of the battery 216, a data table 304 stored in a memory acting as information holding means, a data transmission/reception decision section 303, and a modem communication section 309.

The line quality measuring section 301 measures a current error rate and a response time of a connected destination in a received data demodulation process and then creates information according to the measured results. Information indicating a received level created in the electric field detector of the modulation/demodulation circuit 202 is supplied to the line quality measuring section 301. Further the line quality measuring section 301 has a memory (not shown) which holds various information sets indicating a received level, an error rate, and a response time of a connected destination, every predetermined timing.

Figure 4:
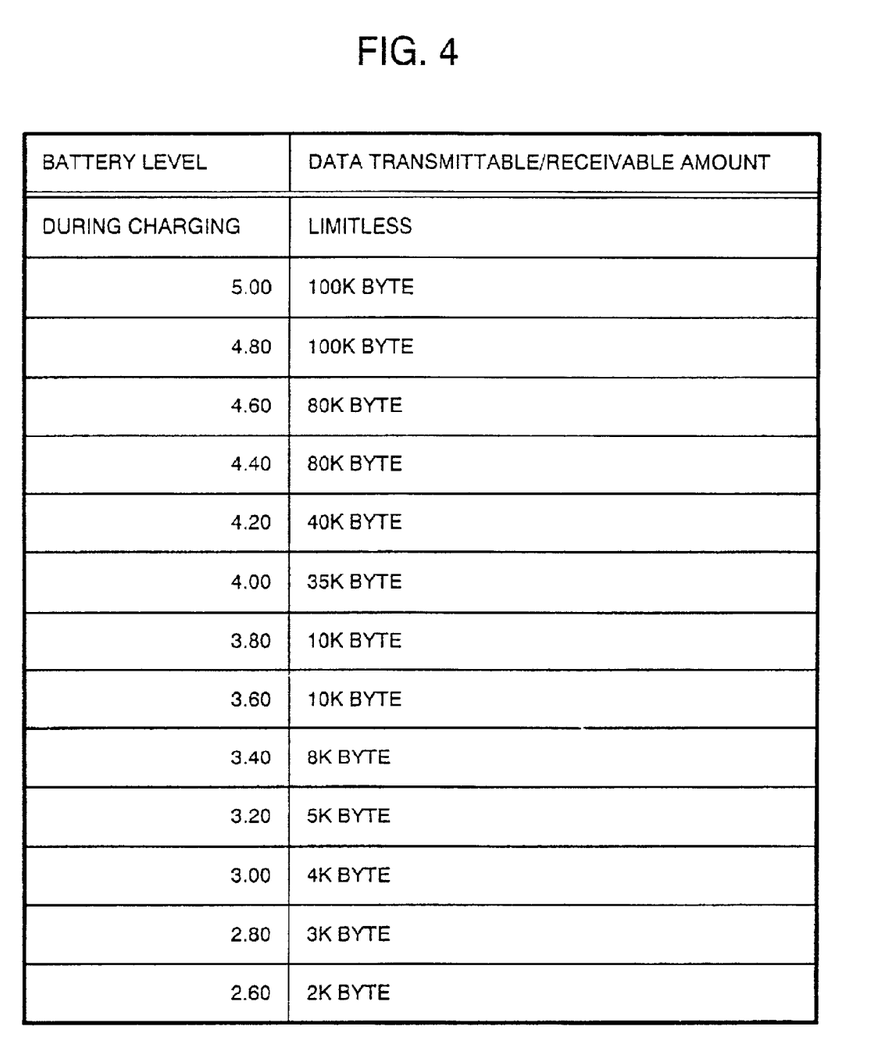
FIG. 4 is an explanatory diagram illustrating a data table in the first embodiment according to the present invention.

The battery level measuring section 302 measures the current voltage level and the current charging amount of the battery 216 and creates information according to the measured results. The data table 304 holds relationships between the output voltage level of the battery 216 and a transmittable/receivable data amount. FIG. 4 shows as an example the content of the data table 304. As shown in FIG. 4, as the output voltage level of the battery 216 decreases, the data transmittable/receivable amount will decrease. The data transmittable/receivable amount is not limited because no voltage variations occur during charging.

Based on current information from each of the line quality measuring section 301 and the battery level measuring section 302, information held in the data table 304, and information from the data transmission/reception prediction section 307 (to be described later), the data transmission/reception decision section 303 decides whether or not data is transmitted and received or whether or not communications are interrupted during transmission or reception. Thus, the data transmission/reception decision section 303 notifies the communication processing section 305 in the information-processing microcomputer 207 of the decision results.

Specifically, the data transmission/reception decision section 303 monitors a current received level, an error rate, and a response time of a connected destination. When these numeral values are not within predetermined values, the data transmission/reception decision section 303 decides that the line is not in a connectable state and that communications cannot be continued if the line currently is in a transmission/reception state. The data transmission/reception decision section 303 compares a current received level with, for example, a received level one minute early, a current error rate with, for example, an error rate one minute early, or a current response time of a connected destination with, for example, a response time of a connected destination one minute early, and then monitors the changes. When these variations are not within predetermined values, the data transmission/reception decision section 303 decides that the line is not in a connectable state and that communications cannot be continued if the line currently is in a transmission or reception state. Moreover, the data transmission/reception decision section 303 checks a transmittable/receivable data amount according to the output voltage level of the battery 216. When the battery capacity is short for the data amount to be transmitted in the current communication, the data transmission/reception decision section 303 decides that the line is not in a connectable state. If data is currently in a transmission/reception state, the data transmission/reception decision section 303 decides that the line is not in a communication connectable state. The data transmission/reception decision section 303 may detect a change of the line state, based on the current information and plural previous information, thus using the detection result as a decision process factor.

The information-processing microcomputer 207, as shown in FIG. 3, includes an application 306 that implements an entry process from the keyboard 214 and an output process to the display 215, the LED section 209, and the alarm section 210. Moreover, the information-processing microcomputer 207 includes a communication processing section 305 equipped with, for example, TCP/IP, a data transmission/reception prediction section 307, and a modem communication section 308.

The data transmission/reception prediction section 307 predicts the data amount transmitted or received through the current communications according to a request from the communication processing section 305 and notifies the communication processing section 305 of the predictive results. The communication processing section 305 inquires the current transmission/reception amount from the data transmission/reception prediction section 307 at the time of starting data communications and notifies the data transmission/reception decision section 303 of the predictive result. Data communications between the communication microcomputer 203 and the information-processing microcomputer 207 are executed via the modem communication sections 308 and 309.

The operation at the time of starting the transmission/reception in the first embodiment having the above-mentioned configuration will be described below. When the application 306 issues an instruction of starting data transmission and reception, the communication processing section 305 inquiries whether or not data can be transmitted and received, from the data transmission/reception decision section 303. The data transmission/reception decision section 303 inquires information about a received level, an error rate, a response time of a connected destination, and the like at a current time and information about a received level, an error rate, a variation in a response time of a connected destination, and the like, one minute, for example, earlier than the current time, from the line quality measuring section 301. When deciding that the line is not in a connectable state, the data transmission/reception decision section 303 notifies the communication processing section 305 that the line cannot be connected.

When deciding that the line is in a connectable state, the data transmission/reception decision section 303 inquires information about the current output voltage level of the battery 216 from the battery level measuring section 302. The data transmission/reception decision section 303 refers to the data table storing obtained results, output voltage levels, and transmittable/receivable data amounts and thus predicts the transmittable/receivable data amount. At the same time, the data transmission/reception decision section 303 inquires the received amount to be currently transmitted, from the data transmission/reception prediction section 307. The data transmission/reception decision section 303 compares two predictive results and decides the possibility of transmission, thus notifying the communication processing section 305 of the decision result. The communication processing section 305 returns the result about permission of connection or permission of data transmission/reception to the application 306. If connection and data transmission/reception can be allowed, the application 306 starts the communication process. If not so, the display 215, the alarm section 210, or the LED section 209 manifests the content to the user.

Even during communication, the communication quality measuring section 301 or the battery level measuring section 302 hands over various information periodically to the data transmission/reception decision section 303. The data transmission/reception decision section 303 continuously implements the decision process. When the data transmission/reception decision section 303 decides that communications will be disconnected on the way, it indicates an interruption event to the communication processing section 305. The communication processing section 305, which has received the interruption event, temporarily halts the current communication operation and then transmits a logging-out command to the server, thus disconnecting the line. At the same time, the communication processing section 305 returns the same content to the application 306. The application 306 notifies the received content to the user by means of the display 215, the alarm section 210, or the LED section 209.

Figure 5:
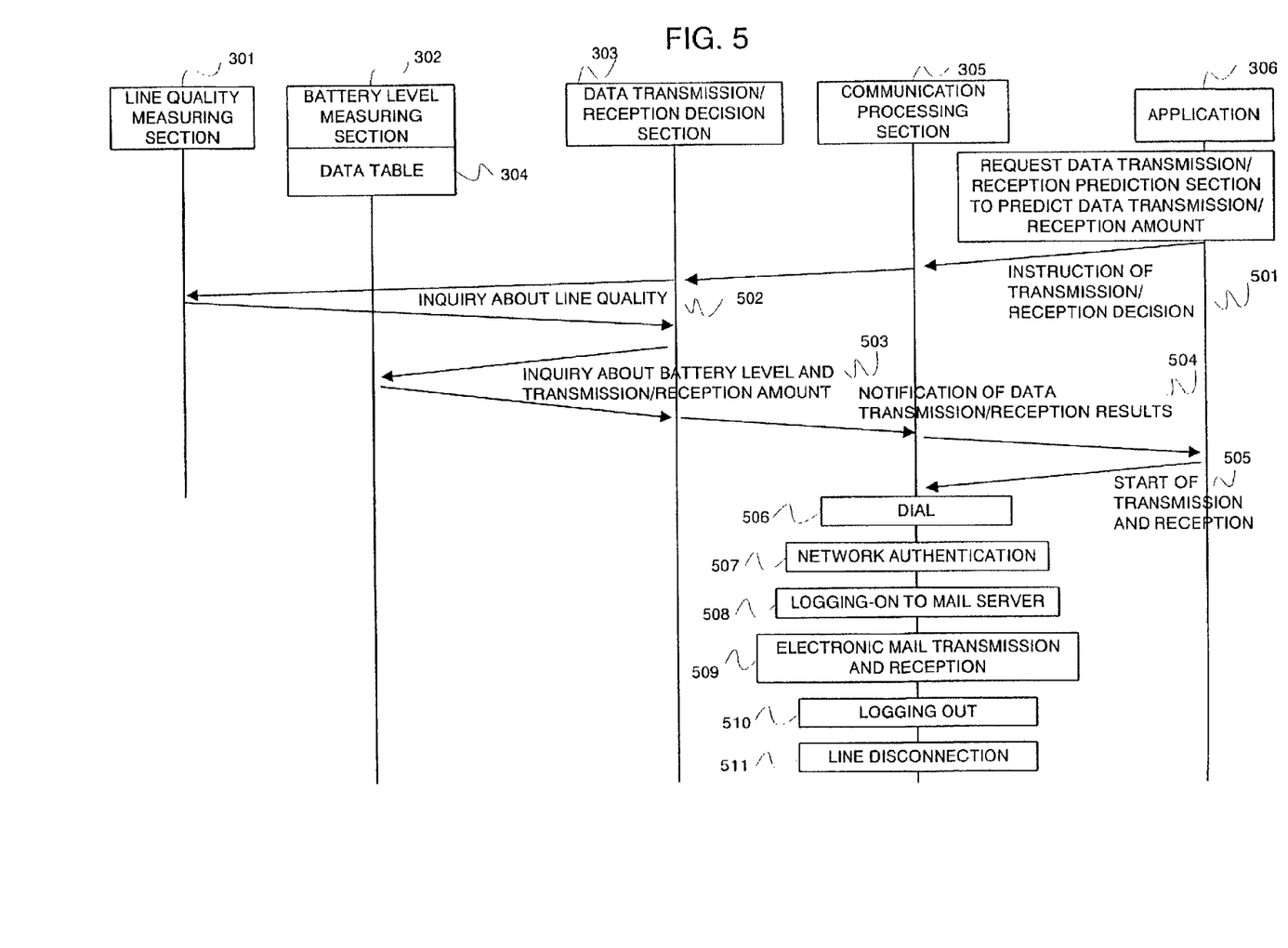
FIG. 5 is an explanatory diagram illustrating the operation of the first embodiment according to the present invention and FIG. 6 is an explanatory diagram illustrating the operation of the first embodiment of the present invention.

The operation of the first embodiment will be described below in more detail. FIG. 5 shows the process flow at the time of starting data communication, in connection with various sections. When the user starts the transmission/reception, the data transmission/reception prediction section 307 predicts the data amount to be transferred in the current communication, according to the instruction from the application 306. When the data amount to be transferred to the current communication is completely predicted, the data transmission/reception prediction section 307 sends the receive decision command (501) to the communication processing section 305, with the predicted data amount handled as an argument.

The communication processing section 305 first inquires a notification history from the line quality measuring section 301 via the data transmission/reception decision section 303 (502). The notification history includes information about a received level, an error rate, and a response time of a connected destination at a current time and various sets of information after the time one minute earlier than the current time. In sequence, the communication processing section 305 inquires the output voltage level of the battery 216 and the data transmittable/receivable amount from the battery level measuring section 302. The battery level measuring section 302 returns the content of the current output voltage level of the battery 216 and the content of the data table 304 to the data transmission/reception decision section 303 (503).

The data transmission/reception decision section 303 implements a decision process according to predetermined information and then returns the decision results to the application 306 via the communication processing section 305 (504). If decision indicates a transmittable/receivable state, the transmission and reception operation starts (505). The data transmission/reception decision section 303 implements a series of communication process including dialing, network authentication, logging on to a mail server, electronic mail transmission and reception, logging-out, and line disconnection (506 to 511). If decision does not indicate a transmittable/receivable state, the data transmission/reception decision section 303 notifies the user of the content by means of the display, the alarm section or the LED section.

Figure 6:
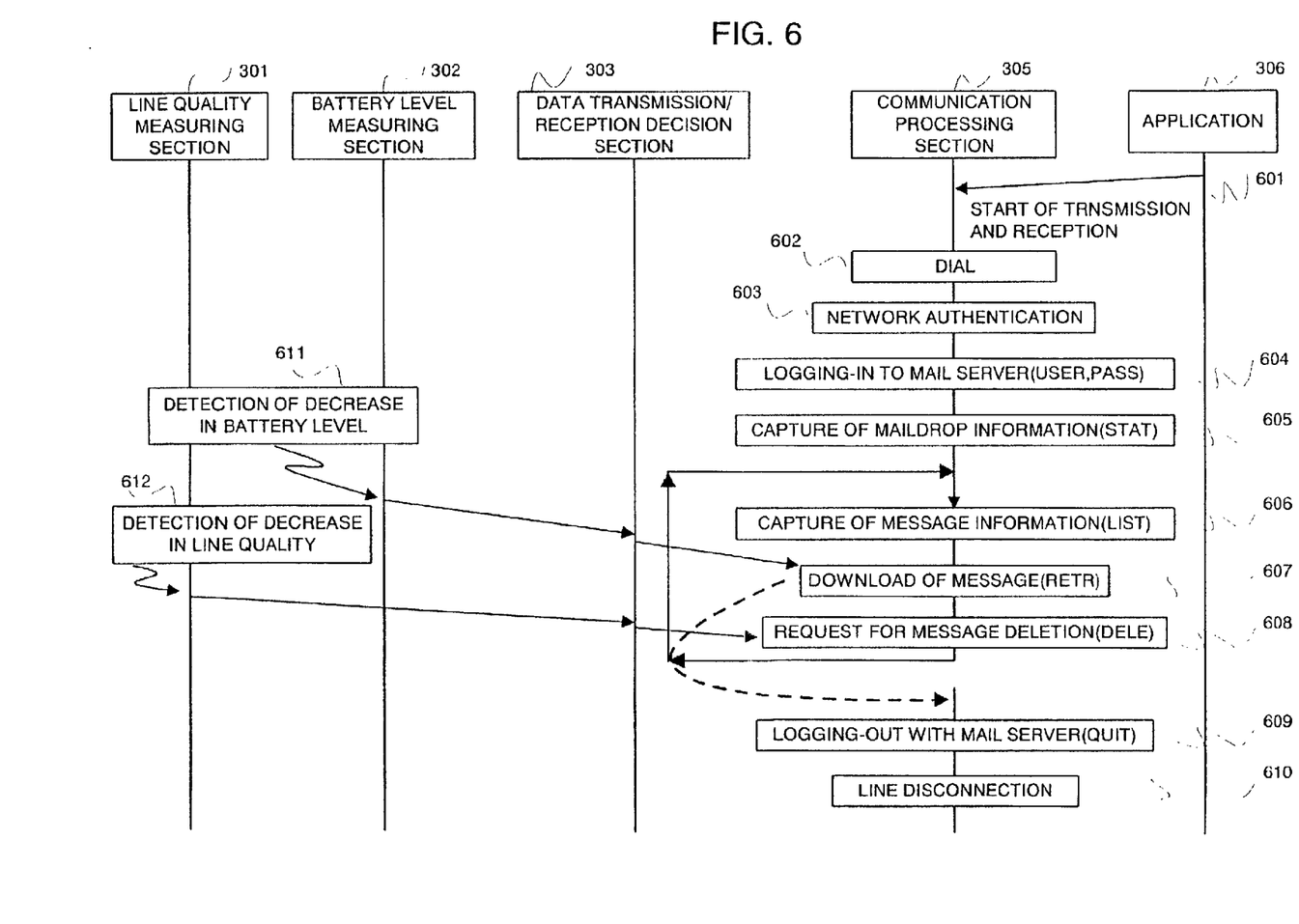

FIG. 6 shows reception of an electronic mail, for example, the process flow of detecting a decrease in output voltage level of a battery or a decrease in line quality after the time of starting transmission and reception, in connection to various sections. A transmission and reception process of an electronic mail starts (601). After dialing, network authentication, and logging on to a mail server (602 to 604), the Maildrop information of the mail server is acquired (STAT) (605) to count the number of mails within the mail server.

If the counting proves that one mail or more is stored, the massage information is acquired (LIST) (606) and then is downloaded (RETR) (607). Upon completion of the downloading, it is required to delete the message (DELE) (608). The request is looped times corresponding to the number of stored messages. Meanwhile, when a drop of the battery level is detected (611) or the line quality drops (612), the logging-out is performed to mail server (QUIT) (609).

Thus, the line is disconnected (610). This enables the communication to be ended, without leaving the connection to the mail server, before communications is disabled due to a decrease in battery level or line quality.

The first embodiment described above provides the following advantages. In the prior art, when the line is disconnected due to a decrease in received level or line quality, the connection is left to the server side. However, according to the first advantage of the present invention, when disconnection of the line is predicted, the logging out is normally established to the server side before the line disconnection so that the connection can be closed. Hence, the load cannot be left on the network. Moreover, in the prior art, when the line is disconnected, with the connection left to the server side, the server side handles the logging-on to the server side as a double logging-on even if the same terminal retries the logging-on to the server, so that the connection cannot be established. However, according to the second advantage of the present invention, such a double logging-on can be avoided and predetermined data can be acquired smoothly and quickly. Moreover, according to the third advantage, the present invention can avoid re-transmission of data due to a decrease in transmission/reception level and a prolonged communication time. As a result, the communication charge can be saved. The waste power consumption of the battery as well as reduction of the serviceable life of the battery can be avoided.

(Second Embodiment)

Next, the second embodiment according to the present invention will be described below. In the first embodiment of the present invention, the case where the process is carried out in accordance with the electronic mail receive protocol has been explained (referring to FIGS. 5 and 6). However, the present invention is applicable to protocols for FTP server (file transfer), HTTP (home page browsing) server, and TELNET (remote access). Any one of those protocols can avoid connections maintained to the server by executing the logging-out command in accordance with the protocol when the line quality, electric field level, or battery level is dropped.

In the first embodiment of the present invention, the case where the present invention is embodied to a portable-phone built-in terminal has been explained. However, the present invention is readily applicable to personal computers and portable terminals or to personal computers and portable terminals (PDA). In such a case, the data transmission/reception decision section, the line quality measuring section, the battery level measuring section, and the data table, on the side of the communication microcomputer in the communication section, may be provided on the side of the portable phone. The line quality, the electric field level, or the output voltage level of a battery is transmitted to a personal computer or portable terminal, using the external I/O such as the 16-conductor interface of a portable phone. Thus, the communication processing section on the side of the personal computer decides whether or not the communication is disconnected. This configuration can realize the operation identical to that of the invention. Moreover, the present invention is readily applicable to communication equipment other than mobile communication equipment. In other words, the present invention is not limited to only the above-mentioned embodiments. The above-described embodiments can be appropriately modified within the technical concept of the present invention. The number, location, and shape of the above-mentioned constituent elements are not limited to the above-mentioned embodiments but can be changed arbitrarily. In the attached drawings, the same numerals are attached to like constituent elements.

The present invention having the above-mentioned configuration has the following advantages. In the prior art, when the line is disconnected due to a decrease in received level, the connection to the server side is maintained. However, according to the first advantage of the present invention, when line disconnection is predicted, the logging out is normally established to the server side before the line disconnection so that the connection can be closed. Hence, this feature enables the load not to be left on the network. Moreover, in the prior art, when the line is disconnected, with the connection left to the server side, the server side implements as a double logging-on the logging-on to the server side to be retried by the same terminal so that the connection cannot be established. However, according to the second advantage of the present invention, such a double logging-on can be avoided and predetermined data can be acquired smoothly and quickly. Moreover, according to the third advantage, the present invention can avoid re-transmission of data due to a decrease in transmission/reception level and a prolonged communication time. As a result, the present invention can save the communication charge. Moreover, the present invention can avoid waste power consumption of the battery as well as reduced serviceable life of the battery.

What is claimed is:

1. A communication device, wherein data is transmitted and received via a communication section and a line, comprising: decision means for deciding whether or not to transmit and receive data based on predetermined information corresponding to the state of the line or the internal state of the device or whether or not to interrupt communications if the device is currently in a transmission/reception state; and a controller for controlling said communication section according decision results from said decision means, said predetermined information containing prediction results based on a prediction of a data amount to be transmitted or received in current communication, wherein said predetermined information contains information representing a reception level.

2. The communication device defined in claim 1, further comprising: an information holder for holding said predetermined information; said decision means deciding whether or not to transmit and receive data based on current predetermined information and old predetermined information held in said holder, or whether or not to interrupt communications if the device is currently in a transmission/reception state.

3. The communication device defined in claim 1, further comprising notification means for notifying a user of decision results according to the decision results of said decision means.

4. The communication device defined in claim 1, wherein when said decision means decides disconnection of communications, said controller controls said communication means to disconnect the line after the logging-out in accordance with a predetermined communication procedure.

5. A communication device, wherein data is transmitted and received via a communication section and a line, comprising: decision means for deciding whether or not to transmit and receive data based on predetermined information corresponding to the state of the line or the internal state of the device or whether or not to interrupt communications if the device is currently in a transmission/reception state; and a controller for controlling said communication section according decision results from said decision means, said predetermined information containing prediction results based on a prediction of a data amount to be transmitted or received in current communication, wherein said predetermined information contains information representing an error rate.

6. A communication device, wherein data is transmitted and received via a communication section and a line, comprising: decision means for deciding whether or not to transmit and receive data based on predetermined information corresponding to the state of the line or the internal state of the device or whether or not to interrupt communications if the device is currently in a transmission/reception state; and a controller for controlling said communication section according decision results from said decision means, said predetermined information containing prediction results based on a prediction of a data amount to be transmitted or received in current communication, wherein said predetermined information contains information representing a response timing from a connected destination.

7. The communication device defined in claim 6, wherein said predetermined information contains information representing an output voltage level of a power source within the device.

8. The communication device defined in claim 7, wherein said power source within the device comprises a secondary battery.

9. The communication device defined in claim 8, further comprising prediction means for predicting a transmittable/receivable data amount based on a charging amount or output voltage level of said secondary battery; said predetermined information containing prediction results acquired by said prediction means.

10. The communication device defined in claim 9, further comprising second prediction means for predicting the data amount to be transmitted or received in current communications; said predetermined information containing the prediction results acquired by said second prediction means.

11. A communication method suitable for a communication device which transmits and receives data via a communication section and a line, said method comprising the steps of: deciding whether or not to transmit and receive data based on predetermined information corresponding to the state of the line or the internal state of the system or whether or not to interrupt communications if the device is currently in a transmission/reception state; and controlling said communication section to disconnect the line after the logging-out in a predetermined communication procedure, in accordance with decision results in said decision step, the predetermined information containing prediction results based on a prediction of a data amount to be transmitted or received in current communication, wherein said predetermined information contains information representing a reception level.

12. The communication method defined in claim 11, further comprising the steps of: holding said predetermined information; deciding whether or not to transmit and receive data based on current predetermined information and old predetermined information held in said holder, or whether or not to interrupt communications if the device is currently in a transmission/reception state.

13. The communication method defined in claim 11, further comprising the step of notifying a user of decision results according to the decision results of said step of deciding.

14. The communication method defined in claim 11, wherein said step of controlling further comprising the step of controlling said communication means to disconnect the line after the logging-out in accordance with a predetermined communication procedure when the decision result of said step of deciding is disconnection of communications.

15. A communication method suitable for a communication device which transmits and receives data via a communication section and a line, said method comprising the steps of: deciding whether or not to transmit and receive data based on predetermined information corresponding to the state of the line or the internal state of the system or whether or not to interrupt communications if the device is currently in a transmission/reception state; and controlling said communication section to disconnect the line after the logging-out in a predetermined communication procedure, in accordance with decision results in said decision step, the predetermined information containing prediction results based on a prediction of a data amount to be transmitted or received in current communication, wherein said predetermined information contains information representing an error rate.

16. A communication method suitable for a communication device which transmits and receives data via a communication section and a line, said method comprising the steps of: deciding whether or not to transmit and receive data based on predetermined information corresponding to the state of the line or the internal state of the system or whether or not to interrupt communications if the device is currently in a transmission/reception state; and controlling said communication section to disconnect the line after the logging-out in a predetermined communication procedure, in accordance with decision results in said decision step, the predetermined information containing prediction results based on a prediction of a data amount to be transmitted or received in current communication, wherein said predetermined information contains information representing a response timing from a connected destination.

17. The communication method defined in claim 16, wherein said predetermined information contains information representing an output voltage level of a power source within the device.

18. The communication method defined in claim 17, wherein said power source within the device comprises a secondary battery.

19. The communication method defined in claim 18, further comprising the step of predicting a transmittable/receivable data amount based on a charging amount or output voltage level of said secondary battery; said predetermined information containing prediction results acquired by said the step of predicting.

20. The communication method defined in claim 19, further comprising the step of secondary predicting the data amount to be transmitted or received in current communications; said predetermined information containing the prediction results acquired by said step of secondary predicting.

* * * * *